United States Patent
Watanabe et al.

[11] Patent Number: 6,125,264
[45] Date of Patent: *Sep. 26, 2000

[54] TELEPHONE APPARATUS

[75] Inventors: Hidekazu Watanabe, Chiba; Osamu Hamada; Yoshihiro Matsuzaki, both of Kanagawa, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/541,729

[22] Filed: Oct. 10, 1995

[30] Foreign Application Priority Data

Oct. 28, 1994 [JP] Japan .................................. 6-264907

[51] Int. Cl.[7] .................................................. H04B 7/00
[52] U.S. Cl. .................................. 455/38.5; 340/825.44; 340/825.46
[58] Field of Search ................. 455/32.1, 38.1–38.2, 455/38.4–38.5, 89, 31.2, 31.3; 340/825.44, 825.46; 379/58–62, 142, 355–357, 372–375

[56] References Cited

U.S. PATENT DOCUMENTS

| | | | |
|---|---|---|---|
| 3,911,416 | 10/1975 | Feder | 340/311 |
| 4,965,569 | 10/1990 | Bennett et al. | 340/825.44 |
| 5,099,513 | 3/1992 | Kim et al. | 379/374 |
| 5,265,145 | 11/1993 | Lim | 379/88 |
| 5,307,059 | 4/1994 | Connary et al. | 340/825.44 |
| 5,459,458 | 10/1995 | Richardson et al. | 340/825.52 |
| 5,508,688 | 4/1996 | Mochizuki | 340/825.44 |

FOREIGN PATENT DOCUMENTS

| | | |
|---|---|---|
| 0631262 | 6/1994 | European Pat. Off. . |
| 9203891 | 3/1992 | WIPO . |
| 9418760 | 2/1994 | WIPO . |

Primary Examiner—Andrew I. Faile
Assistant Examiner—Vincent F. Boccio
Attorney, Agent, or Firm—Jay H. Maioli

[57] ABSTRACT

A signal receiver such as a portable telephone set or pager becomes more convenient when receiving an incoming call. A radio signal receiver for receiving a signal transmitted via a radio communication network line includes calling sound generator operable when an incoming call is received. An informing processing done by the calling sound generator can be varied by the user by selecting keys on a keyboard.

8 Claims, 5 Drawing Sheets

TELEPHONE APPARATUS

BACKGROUND OF THE INVENTION

The present invention relates to a radio receiver such as a portable radio telephone set for receiving a signal transmitted through a radio telephone line network, a radio receiver such as a pager called by a radio signal transmitted from a base station or a signal receiver such as a telephone set connected to a wire telephone line network.

When a portable radio telephone set receives a signal transmitted from a base station or when the portable radio telephone set receives an incoming call (i.e., this telephone set is called), a calling sound signal is generated by a calling sound generator (informing means) of this telephone set. This calling sound signal is supplied to a speaker, from which it is emanated as a calling sound. The user of this telephone set can confirm the incoming call by this calling sound.

When the pager similarly receives a radio signal transmitted from the base station or when the pager is called by an incoming call, a calling sound signal is generated from a calling sound generator (informing means) of this pager. This calling sound signal is supplied to a speaker, from which it is emanated as a calling sound.

Calling sounds generated from almost all types of radio telephone sets are generally beep sounds. Beep sounds are substantially similar although they differ from one another very slightly in tone depending on the types of telephone sets. Therefore, if there are many people with the portable telephone sets around the user, then when one of these portable telephone sets is called, the user cannot determine whether the user's portable telephone is actually called or not.

The user cannot confirm the caller until the user receives an incoming call and talks with the caller. Accordingly, when a call is coming in, the user should answer the phone and confirm the caller even though the situation in which the portable telephone set is in use is changed variously at every moment, i.e., the user cannot always talk with the caller. As a result, the user of the portable telephone set cannot answer only an incoming call from a particular caller.

When the user uses a pager, the user also cannot receive only the incoming call from the particular caller. Specifically, when the pager is called, the pager never fails to inform an incoming call by generating a calling sound. Therefore, the only way that the user can select is to allow the pager to generate a calling sound or to disable the pager to receive an incoming call by turning off the power switch of the pager.

While the portable radio telephone set and the pager for receiving a radio signal are described only, a telephone set connected to a telephone line network encounters with similar problems.

SUMMARY OF THE INVENTION

In view of the aforesaid aspect, it is an object of the present invention to provide a signal receiver in a telephone set and a pager which becomes more convenient when an incoming signal is received.

According to an aspect of the present invention, there is provided a signal receiver for receiving a signal derived from a predetermined path. This signal receiver is comprised of receiving means for receiving a signal, informing means for informing a message of a status of a call received by the receiving means and changing means for changing said message by a setting procedure.

According to another aspect of the present invention, there is provided a signal receiving method which comprises the steps of receiving a signal, informing a message for the status of a call received by the receiving step and changing the message by a setting procedure.

DETAILED DESCRIPTION OF THE PREFERRED EMBODIMENT

The present invention will now be described with reference to the drawings.

Figure 1:
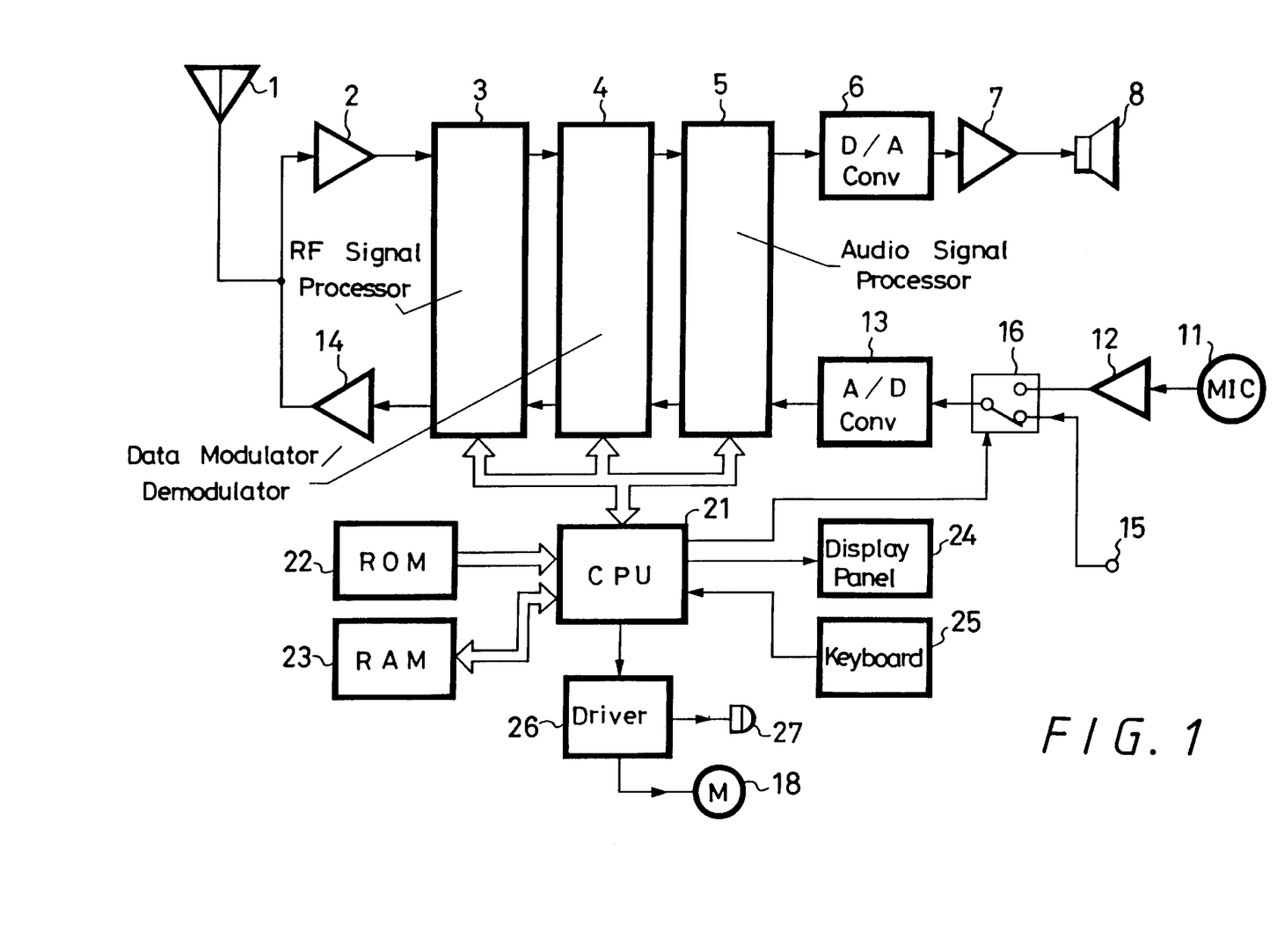
FIG. 1 is a block diagram showing a portable radio telephone set to which the embodiment of the present invention is applied.

FIG. 1 of the accompanying drawings shows in block form a portable radio telephone set to which a signal receiver according to this embodiment is applied.

As shown in FIG. 1, a signal received at an antenna 1 is amplified by an amplifier 2 and supplied to an RF signal processor 3, in which a signal of a predetermined transmission channel is frequency-converted to an intermediate frequency (IF) signal. The intermediate frequency signal from the RF processor 3 is supplied to a data modulator/demodulator (data MODEM) 4, in which it is demodulated in a predetermined manner conforming to the transmission system and in which various received data contained in a demodulated signal are extracted. Audio data in the processed received data is supplied to an audio signal processor 5. Control data in the received data is supplied to a central processing unit (CPU) 21 which controls respective portions of the telephone set. Examples of the control data supplied to the CPU 21 are data which indicate types of callers.

The audio signal processor 5 is a digital audio data processor formed of an IC called a DSP (digital signal processor). The digital audio data processor can process complex audio data processing. Also, the digital audio data processor 5 processes time base expansion on received data supplied thereto from the data MODEM 4. Audio data thus demodulated is supplied to a digital-to-analog (D/A) converter 6, in which it is converted into an analog audio signal. The analog audio signal from the D/A converter 6 is supplied through an amplifier 7 to a speaker 8 and thereby emanated from the speaker 8 as sounds.

Sound picked up by a microphone (MIC) 11 is amplified by an amplifier 12 and supplied to an analog-to-digital (A/D) converter 13 through an input select switch 16, in which it is converted into digital audio data. The digital audio data from the A/D converter 13 is supplied to the audio signal processor 5 and thereby compressed as transmission audio data. Then, the audio data is supplied to the data MODEM 4, in which it is modulated in a predetermined manner conforming to the transmission system.

A transmission signal modulated by the data MODEM 4 is supplied to the RF signal processor 3, in which it is frequency-converted into a signal of a predetermined transmission channel. The frequency-converted signal from the RF signal processor 3 is amplified by an amplifier 14 and supplied to the antenna 1, from which it is transmitted via radio waves.

Transmission and reception in the RF signal processor 3, the data MODEM 4 and the audio signal processor 5 are carried out under control of the CPU 21.

A read-only memory (ROM) 22 and a random access memory (RAM) 23 are connected to the CPU 21 which controls the telephone set. There is control program in the ROM 22 necessary for controlling the telephone set and a plurality of kinds of data (sound elements data) for generating an audible ringing signal previously stored therein. The RAM 23 stores therein data concerning functions that the user can set freely.

The telephone set includes a display panel 24 composed of a liquid crystal display panel and a driver therefor (not shown) and an operation keyboard 25 having a key pad with dial numbers or the like attached thereto. Operating state of the telephone set is displayed on the display panel 24 under control of the CPU 21 and operating information of the keyboard 25 is supplied to the CPU 21. The telephone set further includes a light-emitting diode (LED) 27 which is driven to emit light by a driver 26 based on a command signal from the CPU 21.

The radio telephone set according this embodiment can vary an audible ringing signal which informs an incoming call to the user. A manner in which a calling sound for informing an incoming call to the user is generated will be described. When the CPU 21 determines on the basis of control data transmitted to the telephone set from a base station that there is an incoming call, the CPU 21 issues a calling sound generating command signal to the audio signal processor 5. When the audible ringing signal generating command signal is supplied to the audio signal processor 5, sound elements data stored in the ROM 22 and data concerning a calling sound generating method stored in the RAM 23 are supplied to the audio signal processor 5. The audio signal processor 5 generates audio data on the basis of these data supplied thereto and supplies the audio data through the D/A converter 6 and the amplifier 7 to the speaker 8. Then, a calling sound is emanated from the speaker 8.

In this case, the user can designate by operating the keys on the keyboard 25 a manner in which sound elements data stored in the ROM 22 are arranged as sound data of the audible ringing signal in accordance with a program stored in the RAM 23.

A manner in which the method of generating the audible ringing signal is set in the RAM 23 will be described with reference to a flowchart of FIG. 2.

Figure 2:
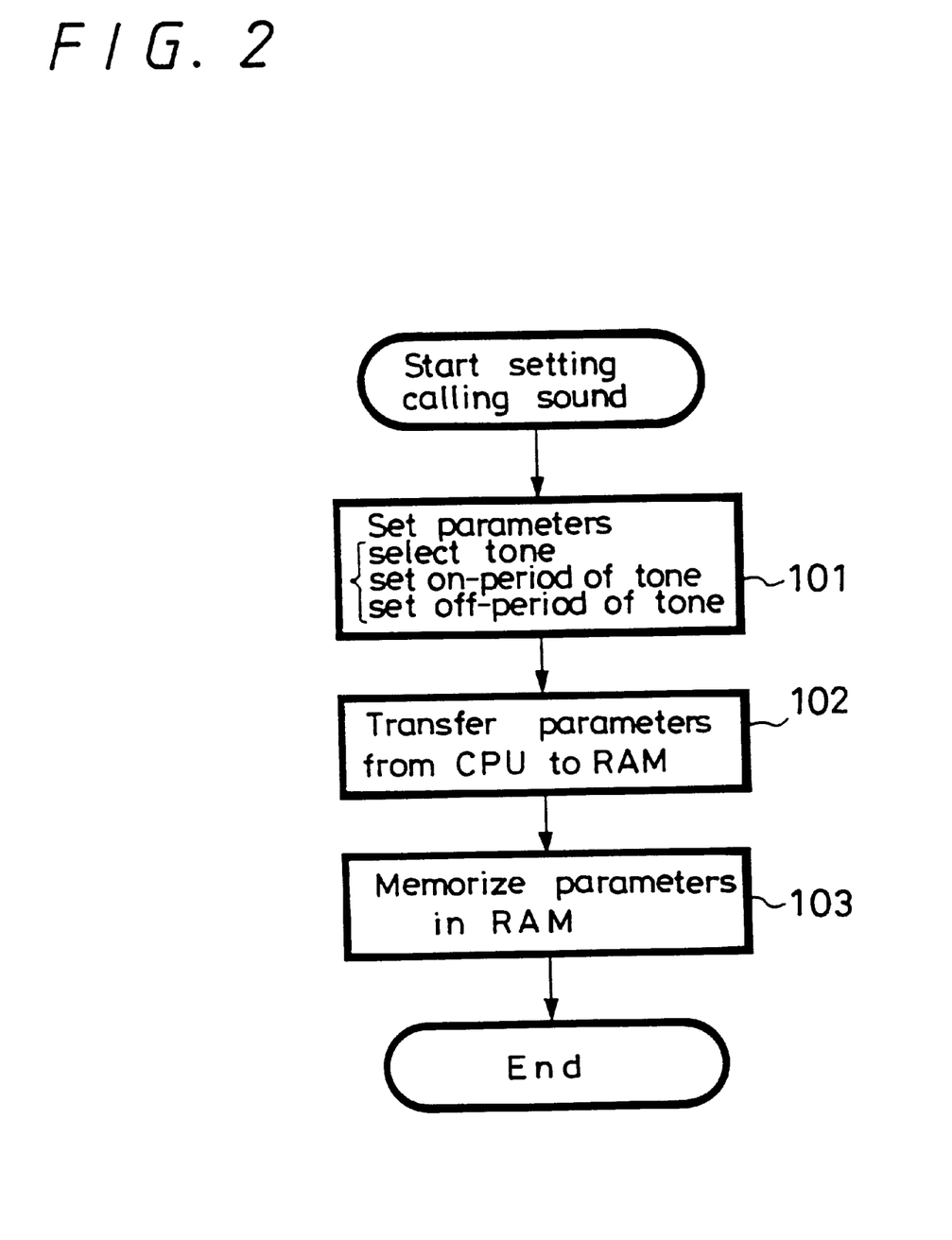
FIG. 2 is a flowchart to which reference will be made in explaining a manner in which a calling sound is set according to the present invention.

As shown in FIG. 2, when the telephone set is placed in a calling sound setting mode by operating predetermined keys on the keyboard 25, in step 101, tone is selected, on-period of the tone is set and off-period of the tone is set by operating predetermined keys on the keyboard 25. The processing proceeds to the next step 102, whereat selected or set parameters are supplied to the RAM 23 under control of the CPU 21. In the next step 103, these parameters are memorized in the RAM 23.

A manner in which a calling sound is generated on the basis of the calling sound parameters thus stored in the RAM 23 when an incoming call arrives will be described with reference to a flowchart of FIG. 3.

Figure 3:
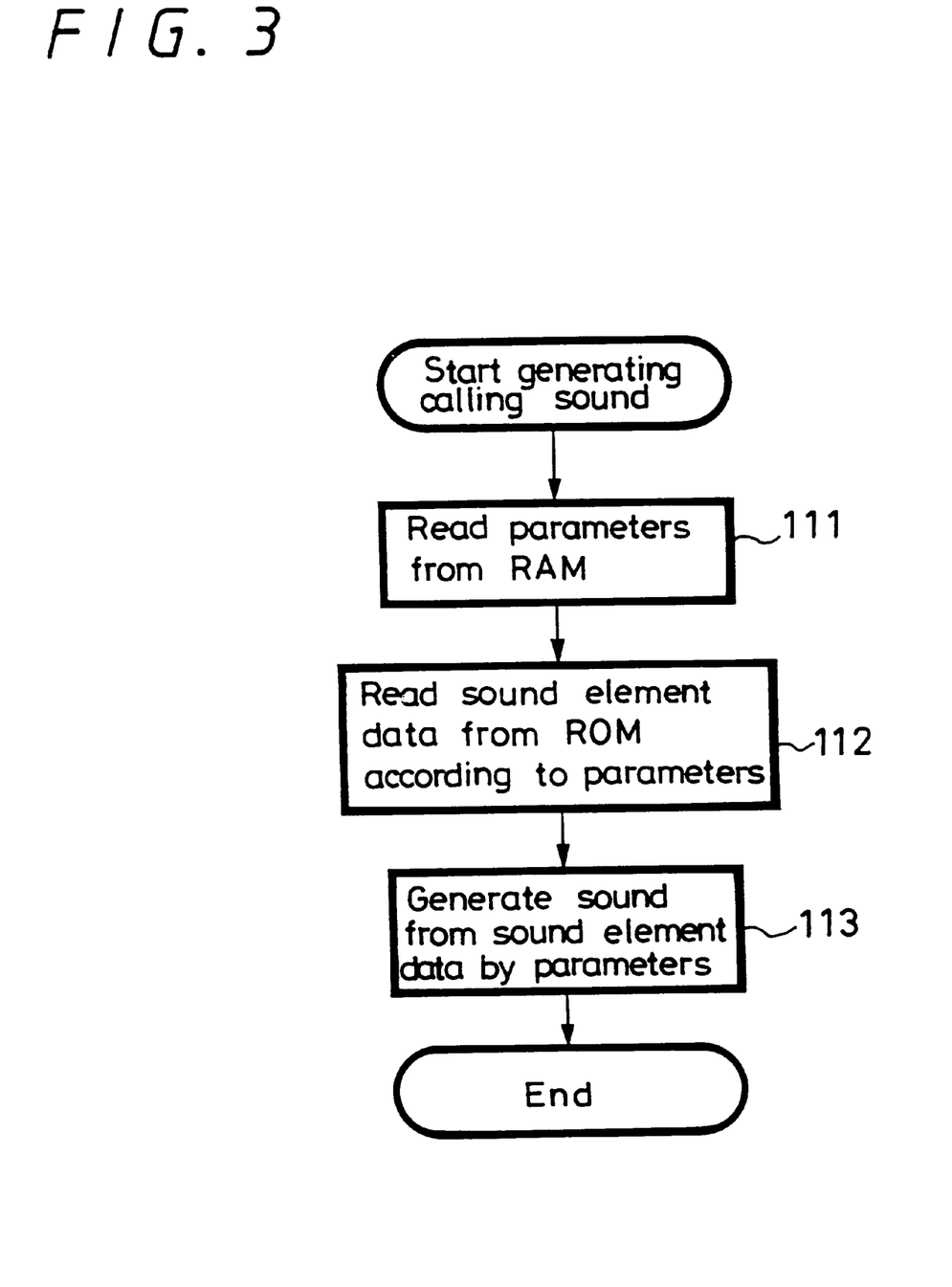
FIG. 3 is a flowchart to which reference will be made in explaining a manner in which a calling sound is generated according to the present invention.

As shown in FIG. 3, when the CPU 21 detects an incoming call, in step 111, the parameter data stored in the RAM 23 are read out and supplied to the audio signal processor 5. Then, the processing proceeds to the next step 112, whereat necessary sound elements data are read out from the ROM 22 in accordance with the parameter data and supplied to the audio signal processor 5. In the next step 113, the audio signal processor 5 processes the sound elements data to provide audio data based on the parameters, i.e., audio data composed of sound elements data of a time indicated by a parameter of on-period and audio data of a time indicated by a parameter of off-period. The thus generated sound data is emanated from the speaker 8 and the calling sound is generated. Then, when the user answers the incoming call, the calling sound is stopped and the user can communicate with the caller.

Since the user can freely set the calling sound when an incoming call arrives as described above, the user can set different calling sounds on respective telephone sets. Respective telephone sets are given particular calling sounds. Therefore, when there are a plurality of portable radio telephone sets, it becomes possible for the user to distinguish a portable radio telephone set which generates a calling sound.

Since the audio processor 5 which is often referred to as a DSP (digital signal processor) processes an audio signal for transmitting and generates a calling sound, a circuit exclusively used for generating a calling sound is not required and a calling sound can be generated with selectable parameters (tone, continuing time, pause time, etc.) by the audio signal processing in the audio processor 5. Therefore, if only sound elements data of original tone are previously stored in the memory 22, then a variety of calling sounds can be generated. A variety of calling sounds can be set by the simple arrangement. Specifically, as compared with the case that sound data of a plurality of kinds of calling sounds are previously stored in the memory and a calling sound is set by selecting sound data read out from the memory, an amount of data stored in the memory can be reduced considerably and the kind of calling sounds that can be set can be increased.

The audio processor 5 which is referred to as a DSP is required by a digital radio telephone set for transmitting digital audio data, when this audio processor 5 is applied to, in particular, a digital radio telephone set, the processing in this embodiment can be carried out by adding only one circuit (memory with a storage capacity large enough to store sound elements data).

Sound elements data read out from the memory so as to generate calling sound may be used to generate a more complex calling sound by combining plurality of kinds of data. Alternatively, a plurality of kinds of data indicative of a piece of music or speech may be previously stored in the ROM 22 so that calling sound based on a piece of music or speech may be set freely. Further, data indicative of a piece of music or speech may be freely input to the RAM 23 from the outside of the telephone set, whereby a piece of music or speech may be used as calling sound. As a manner in which audio data such as a piece of music or speech are processed, audio data input to the telephone set from the microphone 11 of the telephone set may be stored in the RAM 23 or audio data input to the telephone set from an external data input terminal 15 may be stored in the RAM 23. In this case, audio data input from the microphone 11 and the external data input terminal 15 are selectively switched by an input select switch 16 in response to a command signal input by the user through a keyboard 25 under control of the CPU 21.

While one calling sound is set in one telephone set as described above, the present invention is not limited thereto and a plurality of kinds of calling sounds may be set in one telephone, whereby the calling sounds may be selected in response to the state of incoming signal. Specifically, in the case of the radio telephone system, when an incoming call is received, the telephone set indicates an identification (ID) number (telephone number) of the caller by reading data transmitted from the base station. If it is determined that the telephone number of the caller is the telephone number registered in the called telephone set, then a different calling sound may be generated.

A manner in which a different calling sound is set will be described below. A portable radio telephone set has a so-called telephone directory function. According to the telephone directory function, a plurality of telephone numbers and names corresponding to these telephone numbers are previously stored and registered in the memory (RAM 23 in FIG. 1) of the telephone set. Simultaneously, the registered telephone numbers and names are displayed on a display panel 24 such that a desired telephone number can be easily called if necessary. In this case, telephone numbers to be distinguished being called are registered in the RAM 23 by use of this telephone directory function. A manner in which a called telephone number is set will be described with reference to a flowchart of FIG. 4.

Figure 4:
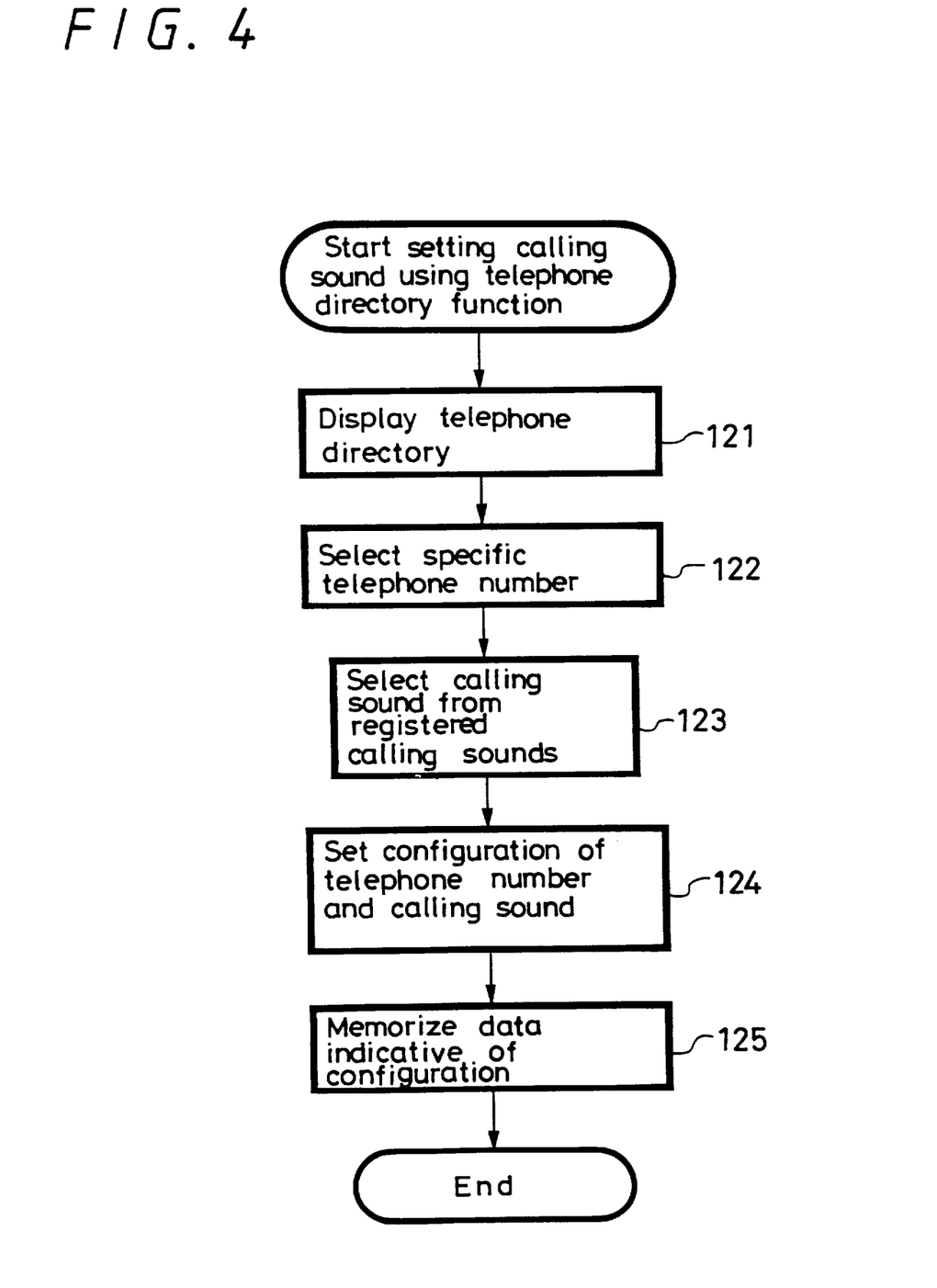
FIG. 4 is a flowchart to which reference will be made in explaining a manner in which a telephone number to be identified of an incoming call is set according to the present invention.

As shown in FIG. 4, in step 121, registered telephone numbers are sequentially displayed on the display panel 24. Then, the processing proceeds to step 122, whereat a specific called telephone number is selected from the telephone numbers displayed on the display panel 24. The processing proceeds to step 123, whereat a calling sound set to the selected telephone number is selected from the registered calling sounds. In the next step 124, when the calling sound is selected, data indicative of configuration of the selected telephone number and in the next step 125, the selected calling sound are stored in the RAM 23 under control of the CPU 21 and the processing is ended.

Therefore, the CPU 21 judges data indicative of the telephone number of the caller contained in the control data transmitted from the base station when an incoming call is received. Then, if it is determined by the CPU 21 that the telephone number is the telephone number registered together with the calling sound in the RAM 23, then a corresponding calling sound is generated.

Thus, the call from the particular caller can be confirmed by the calling sound before the called person answers the incoming call. Therefore, this telephone set become more useful.

When the calling sound is changed in accordance with the registered caller, a calling sound may be set in accordance with kinds (classification) of callers. Specifically, different calling sounds may be set in response to an incoming call from the person in company connection and an incoming call from the person in private life.

A manner in which different calling sounds are set in response to the categories of the callers will be described with reference to a flowchart of FIG. 5. In this case, let it be assumed that three kinds of calling sounds #1, #2 and #3 are set previously.

Figure 5:
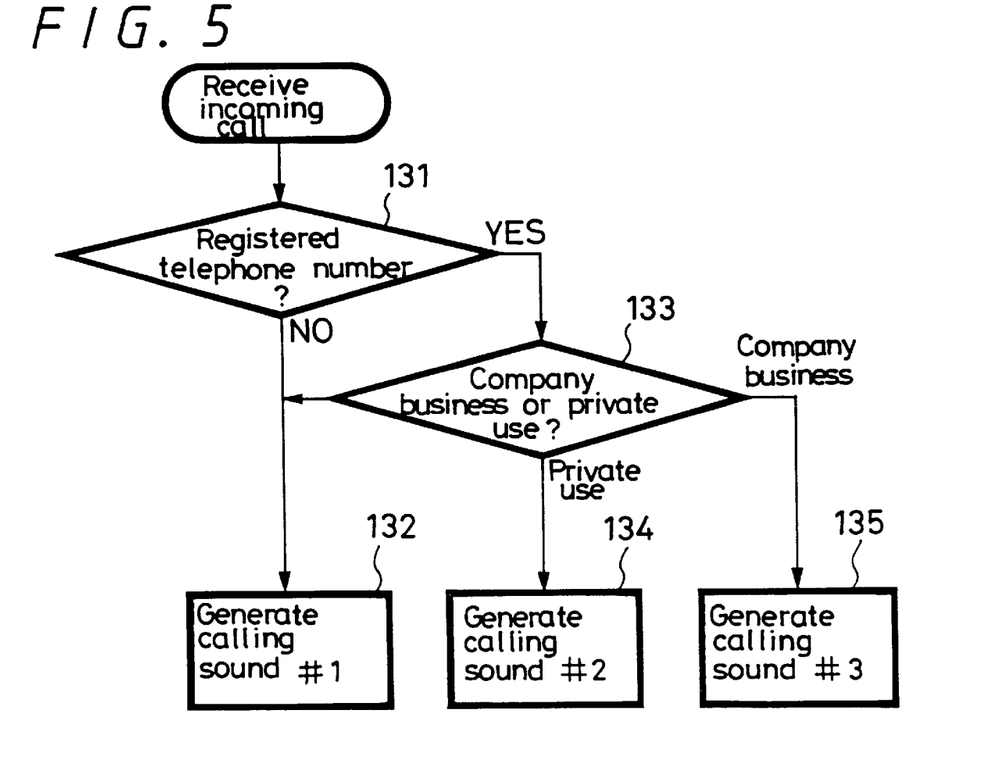
FIG. 5 is a flowchart to which reference will be made in explaining a manner in which different calling sounds are generated based on a telephone number of a caller.

As shown in FIG. 5, after an incoming call is received, the processing proceeds to the next decision step 131, whereat it is determined by the CPU 21 whether the telephone number of caller indicated by data transmitted when an incoming call is received is a telephone number registered on the telephone set or not. If the telephone number is not the registered telephone number as represented by a NO at decision step 131, then the processing proceeds to a step 132, whereat the calling sound #1 is generated. If the telephone number is the registered telephone number as represented by a YES at decision step 131, then the processing proceeds to the next decision step 133, whereat it is determined by the CPU 21 whether the category of the telephone number is a company business or a private use. If the category of the telephone number is the private use, then the processing proceeds to step 134, whereat the calling sound #2 is generated. If the category of the telephone number is the company business, then the processing proceeds to step 135, whereat the calling sound #3 is generated. If the category of the registered telephone number is not clear, then the calling sound #1 is generated at the step 132.

If the calling sound is changed in response to the category of the caller as described above, then the user can confirm the category of the incoming call by the calling sound. Therefore, the telephone set according to the present invention becomes more useful.

While the calling sound is changed in response to the category of the registered telephone number, i.e., private use and company business as described above, a fundamental principle of the present invention can also be applied to the next case. The calling sound can be changed in response to the tone of facsimile image data from a facsimile apparatus or the tone of ordinary telephone sound from ordinary telephone. Both can be determined on the basis of an ID code added to transmitted data, the tone signal of a facsimile or the category of the registered telephone numbers. A manner in which the calling sound is changed in response to the tone of the transmission data will be described with reference to a flowchart of FIG. 6.

Figure 6:
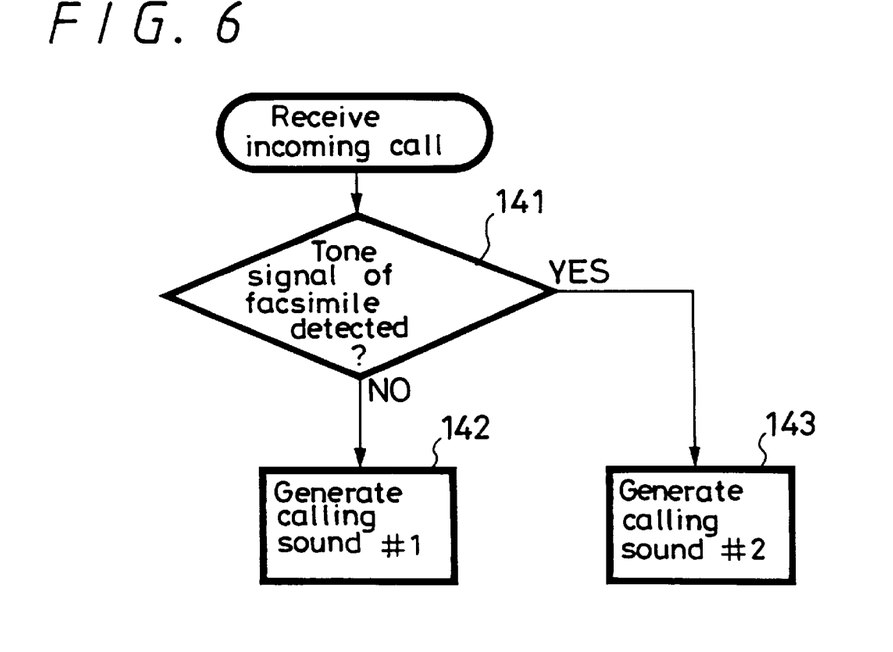
FIG. 6 is a flowchart to which reference will be made in explaining a manner in which different calling sounds are generated depending on facsimile image data reception and ordinary audio data reception.

As shown in FIG. 6, after an incoming call is received, the processing proceeds to the next decision step 141, whereat it is determined whether a tone signal of a facsimile is detected. If the tone signal is not detected as represented by a NO at decision step 141, then the processing proceeds to a step 142, whereat the calling sound #1 is generated. If on the other hand the tone signal is detected as represented by a YES at decision step 141, then the processing proceeds to a step 143, whereat the calling sound #2 is generated.

While the present invention is applied to the portable radio telephone set as described above, a fundamental principle of the present invention can similarly be applied to other radio receivers which need a calling sound, e.g., a pager. The pager emanated a calling sound when the pager receives an call signal transmitted thereto from a base station and detects that it is called by the caller. Fundamentally, the pager includes only a data receiving circuit of the portable radio telephone set shown in FIG. 1. Sometimes, the pager includes a display panel for displaying thereon a message (telephone number, etc.) of the caller contained in received data.

If the calling sound can be freely set on the pager, then the user of the pager can easily identify which pager is called from a plurality of pagers similarly to the case of the portable radio telephone set described above.

If a plurality of calling sounds can be freely set on the pager, then when a telephone number contained in a message transmitted from the caller is a telephone number registered on the pager, a different calling sound may be generated.

While the incoming call is informed to the user by the calling sound as described above, the incoming call may be informed to the user by other suitable means. For example, the portable radio telephone set shown in FIG. 1 includes a light-emitting diode (LED) 27 which is driven by a driver 26 to emit light. The light-emitting diode 27 is driven by the Driver 26 in response to a command signal supplied from the CPU 21 when an incoming call is received, thereby informing the user that the incoming call is received. A light-emitting pattern (light-emitting interval, etc.) of the light-emitting diode 27 may be set freely. Furthermore, a desired light-emitting pattern may automatically be selected from a plurality of kinds of light-emitting patterns depending on the identified state when an incoming call is received.

Alternatively, the case that the incoming call is informed to the user by the calling sound and the case that the incoming call is informed to the user by light emitted from the light-emitting diode 27 may be switched on the basis of the telephone number identified when an incoming call is received.

Furthermore, an incoming call informing means based on a vibration may be used in combination of the above suitable incoming call informing means. As shown in FIG. 1, the portable radio telephone according to the present invention includes a vibrator 18 driven by the driver 26. Then, the case that the calling sound is generated and the case that the vibrator 18 is vibrated may be switched on the basis of the state identified when an incoming call is received. Alternatively, the case that the incoming call is informed to the user by light emitted from the light-emitting diode 27 and the case that the incoming call is informed to the user by vibration of the vibrator 18 may be selectively switched. Further, on the basis of state identified when an incoming call is received, it is possible to change the vibration state such as a period during which the vibrator 18 is vibrated.

While the signal receiver receives a radio signal as described above, the present invention is not limited thereto and can of course be applied to a telephone set connected to a wire telephone line.

According to the present invention, since the informing process has been done by the informing means operable when an incoming call is received can be changed by the setting, an individual informing processing can be carried out at every signal receiver, thereby making it possible to identify respective signal receivers based on the state of the informing process. Therefore, the telephone set and the pager can be made more convenient.

Since the output state of the calling sound can be changed, an individual calling sound can be set freely at every signal receiver and the respective signal receivers can be identified by the sort of the calling sound.

Since the data indicative of the calling sound is generated on the basis of audio data stored in the memory, the calling sound can be easily varied only by varying the audio data read out from the memory.

Since audio data from the outside can be stored in the memory, the calling sound can be set freely and a desired calling sound can be set by the user.

Further, since the informing processing can be varied by the sort of information judged by the judging means for judging information contained in the received signal, it becomes possible to carry out a different informing processing each time an incoming call is received. Therefore, the type of the incoming call signal can be judged by the incoming call informed state only, such as the calling sound.

Furthermore, since a particular caller is judged by the judging means and the informing processing is varied when the particular caller is judged, it becomes possible to identify a particular caller by the calling sound or the like.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A signal receiver for receiving a signal transmitted by a caller when calling a user of said signal receiver, said signal receiver comprising:

receiving means for receiving said signal, wherein said signal includes control data indicating an identity of said caller;

recognizing means for recognizing said identity of said caller based on said control data included in said signal;

a read-only-memory (ROM) for storing a plurality of sound elements;

a random-access-memory (RAM) for storing a plurality of calling indications pre-programmed by said user at said signal receiver to correspond to a respective plurality of pre-selected callers including said caller, wherein said plurality of calling indications are pre-programmed by said user at said signal receiver based on said plurality of sound elements;

informing means for informing said user of said identity of said caller by generating a calling indication selected from said plurality of calling indications stored in said RAM and pre-programmed by said user to correspond to said caller;

a microphone and an external audio input terminal, wherein said calling indications stored in said RAM are input by said user using one of said microphone and said external audio input terminal; and pre-programming means for changing at said signal receiver said plurality of calling indications in accordance with a calling indication setting procedure stored in said RAM, wherein said pre-programming means includes a keyboard integrally formed in said signal receiver for manipulating said pre-programming means by said user.

2. The signal receiver as claimed in claim 1, further comprising a speaker and wherein said informing means generates said calling indication in the form of a sound output from said speaker.

3. The signal receiver as claimed in claim 2, wherein said calling indication is formed of a tone of a predetermined period.

4. The signal receiver as claimed in claim 1, further comprising a light emitting diode and wherein said informing means transforms said calling indication to a light output from said light emitting diode.

5. The signal receiver as claimed in claim 1, further comprising a motor and wherein said informing means transforms said calling indication to a vibration output from said motor.

6. The signal receiver as claimed in claim 1, wherein said recognizing means further recognizes a predetermined kind of data forming said received signal, and wherein said calling indication is changed by said informing means when said recognizing means recognizes said predetermined kind of data.

7. A signal receiving method for use in a signal receiver having a keyboard integrally formed thereon comprising the steps of:

storing a plurality of sound elements in a read-only-memory (ROM);

receiving a signal transmitted by a caller when calling a user of said signal receiver, wherein said signal includes control data indicating an identity of said caller;

recognizing said identity of said caller based on said control data;

storing in RAM a plurality of calling sounds pre-programmed by said user at said signal receiver to correspond to a respective plurality of pre-selected callers including said caller, wherein said plurality of calling sounds are pre-programmed by said user at said signal receiver based on said plurality of sound elements;

informing said user of said identity of said caller by generating a calling sound selected from said plurality of calling sounds stored in said RAM and pre-programmed by said user to correspond to said caller, wherein said calling sounds stored in said RAM are input by said user using one of a microphone and a external audio input terminal; and changing said plurality of calling sounds at said signal receiver by said user manipulating said keyboard in accordance with a calling sound setting procedure.

8. The signal receiving method as claimed in claim 7, further comprising the steps of:

recognizing a predetermined kind of data forming said signal; and changing said calling sound according to a result of said step of recognizing a predetermined kind of data.

* * * * *